United States Patent [19]

De Haan et al.

[11] 4,388,380
[45] Jun. 14, 1983

[54] LITHIUM CELL HAVING DEPLETION GAUGE

[75] Inventors: Abel De Haan, Pembroke Pines; Harshad Tataria, Miami, both of Fla.

[73] Assignee: Cordis Corporation, Miami, Fla.

[21] Appl. No.: 321,350

[22] Filed: Nov. 16, 1981

[51] Int. Cl.³ .......................................... H01M 10/48
[52] U.S. Cl. .................................... 429/91; 429/92
[58] Field of Search ............................... 429/91, 90, 92

[56] References Cited

U.S. PATENT DOCUMENTS 4,126,735 11/1978 Fritts ................................... 429/91
4,259,415 3/1981 Tamura et al. ..................... 429/90

Primary Examiner—Anthony Skapars
Attorney, Agent, or Firm—Henry W. Collins; Thomas R. Vigil

[57] ABSTRACT

A lithium cell which includes an outer conductive housing, a cathode having one major surface in contact with the conductive housing, an insulative separator adjacent to the other major surface of the cathode, and a lithium anode having a major surface adjacent to the insulative separator. The lithium anode is comprised of two lithium plates, each having a major surface in contact with the other. One of these major surfaces is formed with a stepped portion to thereby form a gap between the lithium plates. A conductive sensing element is positioned within the gap and is in electrical contact with one of the lithium plates and is electrically isolated from the other lithium plates. With this arrangement an electrical potential which exists between the conductive sensor and the outer conductive housing falls to zero volts when the lithium plate in contact with the conductive sensor has become consumed to thereby provide an indication of predetermined level of discharge of the cell.

8 Claims, 6 Drawing Figures

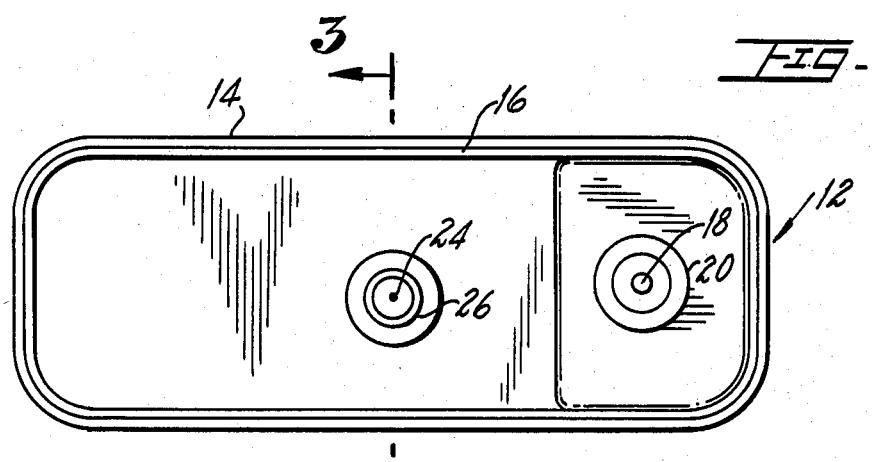
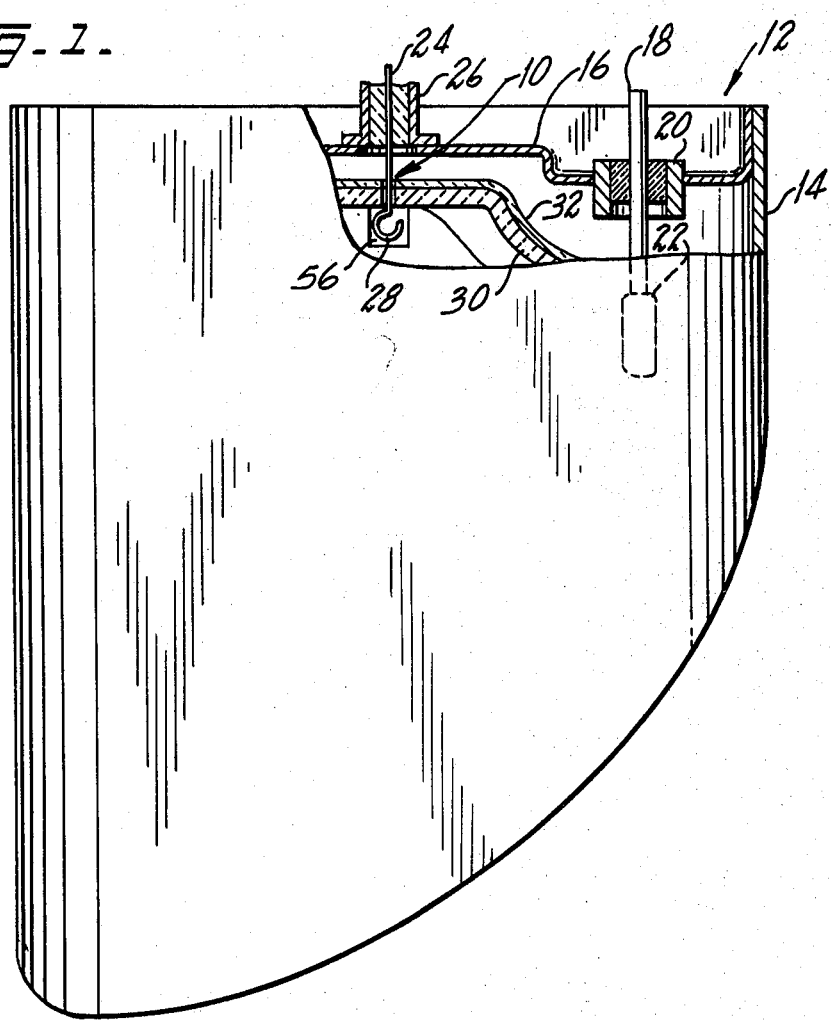

LITHIUM CELL HAVING DEPLETION GAUGE

BACKGROUND OF THE INVENTION

The present invention relates to lithium batteries and, more particularly, to lithium batteries having depletion gauges or indicators.

Lithium batteries have become well-known for their long life and suitability as power sources for cardiac pacers and nerve stimulators. Normally these batteries utilize a lithium anode, a cathode formed of cupric sulfide or silver chromate, and an electrolytic solution.

With the long life associated with such batteries and due to the fact that such batteries are generally implanted within the human body, it is desirable to have a method for indicating that a predetermined level of discharge has occurred. This is particularly important in life sustaining devices, such as cardiac pacers, in order to provide adequate time for the removal of the power source before it fails.

An important feature of the present invention is that of providing a means within a battery for providing a positive indication when a predetermined level of discharge has occurred, or conversely, to provide a positive indication when the remaining life of a battery has reached a predetermined level.

It is important that the positive indication of remaining battery life be provided regardless of the type of service the battery has been providing. In addition, it is important that the depletion indicator be compatible with the present construction and configuration of lithium batteries utilized in implanted devices such as cardiac pacers and nerve stimulators.

In certain types of lithium batteries, the internal resistance of the battery increases linearly with the discharge of the cell. With this type of battery, the output voltage provides a satisfactory indication of the remaining life of the cell.

With certain lithium batteries used in cardiac pacers, the voltage output remains approximately constant until the cell is completely discharged. With other types of lithium batteries, such as the lithium-cupric sulfide battery, an end-of-life indication may be obtained by taking advantage of the two stages of discharge i.e.:

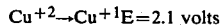

$Cu^{+2} \rightarrow Cu^{+1} E = 2.1$ volts

$Cu^{+1} \rightarrow Cu^0 E = 1.7$ volts

By adjusting the ratio of lithium to cupric sulfide, it is possible to control the ratio of these two reactions. Accordingly, when the transition from the higher voltage to the lower voltage occurs, this change in voltage provides an indication that a predetermined level of discharge of the cell has occurred. In batteries used with cardiac pacers, the length of the second voltage level is adjusted to be approximately 10 percent of the first voltage level. One problem with the dual voltage level system is that once the second level is obtained, the battery may then last from three months to one year depending upon the load applied to the battery at the lower voltage level.

With cardiac pacers of more modern design which include complex programmable capabilities, the drain on the battery may vary over a broad range. It, therefore, becomes desirable to have an additional means for evaluating the residual capacity of the battery at a time early enough to establish orderly plans for the replacement of the device. Also, as greater loads are placed upon batteries, the effectiveness of the dual level indicator system is substantially reduced.

SUMMARY OF THE INVENTION

The present invention is directed toward a lithium cell which comprises an outer conductive housing, a cathode member which is positioned adjacent to the conductive housing, an insulative separator positioned adjacent to the other side of the cathode member, and a lithium anode which is positioned adjacent to the other side of the insulative separator. The lithium anode is comprised of two separate plates of lithium material, each of which has a major surface in contact with the other. A small gap is formed between the major surfaces of the lithium plates, and a conductive sensor is positioned within this gap and is placed in contact with the surface of one of the lithium plates. The conductive sensor is electrically insulated from the other lithium plate. With this configuration, a voltage potential is developed between the conductive sensor and the conductive housing until the lithium slab which is contact with the conductive sensor has become consumed. Once this lithium slab has been consumed, the voltage potential drops to zero to thereby provide a positive indication of a predetermined level of discharge of the cell.

By varying the ratio of the thickness of the two lithium slabs with respect to each other, it is possible to vary the percentage of depletion which brings about an indication of a predetermined level of discharge. In other words, in order to obtain an indication when 10 percent of the useful life of the cell members, a ratio of 10 to 1 would be established for the thickness of both lithium plates relative to the thickness of the lithium plate which is insulated from the conductive sensor.

BRIEF DESCRIPTION OF THE DRAWINGS

FIG. 1 is an elevational view shown partly in cross-section of a lithium battery with the depletion gauge of the present invention;

FIG. 2 is a top elevational view of the battery illustrated in FIG. 1;

BRIEF DESCRIPTION OF THE INVENTION

Figure 3:
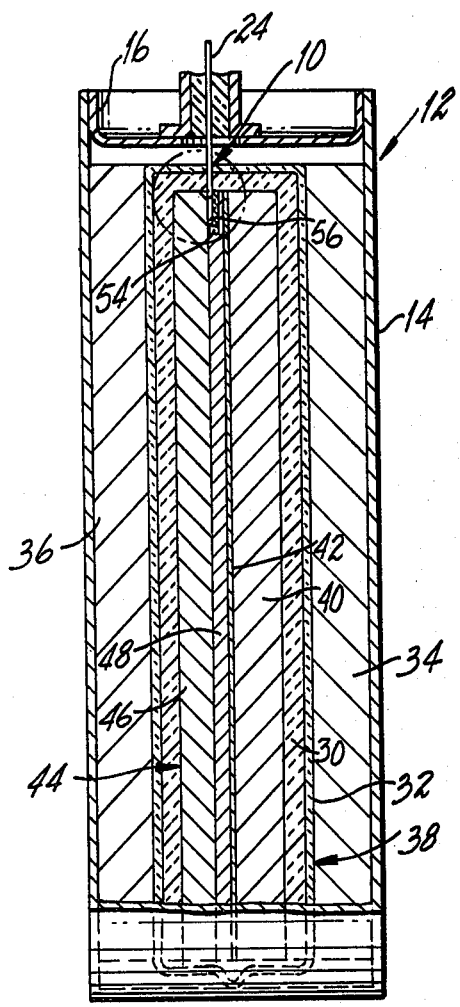
FIG. 3 is a sectional view of the battery shown in FIG. 2 taken along and in the direction of the line 3—3 of FIG. 2 prior to any depletion of the battery.

FIGS. 1 and 2 generally illustrate the depletion gauge 10 of the present invention shown in conjunction with a lithium battery 12. The battery type 12 is of a type which may be used with cardiac pacers. More particularly, the lithium battery 12 includes an outer conductive case 14 which is preferably drawn as one piece from stainless steel. A lid member 16 is also fabricated from stainless steel and is welded to the top of the conductive case 14 in order to provide a hermetically sealed housing.

An anode lead 18 extends through the lid member 16 by way of a glass-to-metal seal 20. The end 22 of the anode lead 18 is flattened for electrical contact to a lithium anode within the battery 12. A conductive sensing wire 24 also extends through the lid member 16 by way of a glass-to-metal seal 26. The end 28 of the sensing wire which is positioned within the conductive case 14 is formed into a crook configuration for electrical contact with an anode of the battery 12. As will be described in more detail, a pair of insulative coverings 30, 32, serve to store electrolyte and electrically insulate the anode of the battery 12 from adjacent components.

Figure 4:
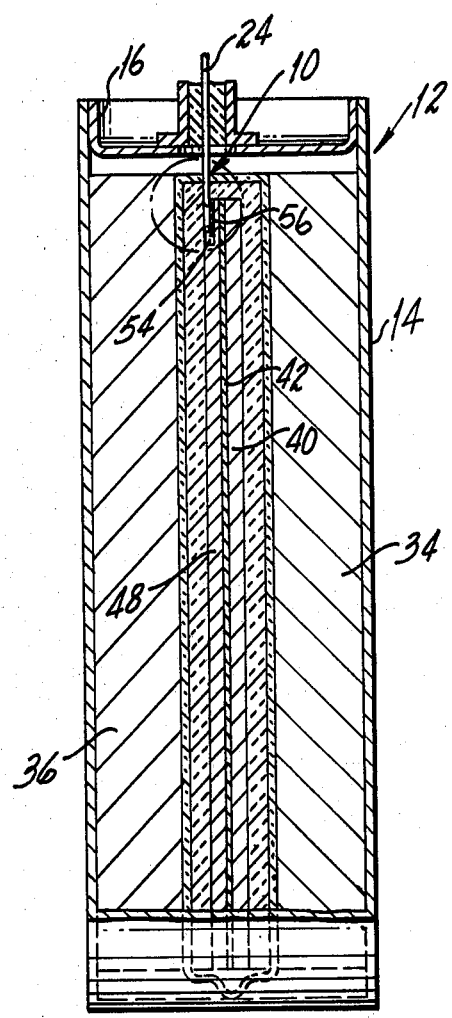
FIG. 4 is a similar view to that illustrated in FIG. 3 after substantial depletion of the battery.
Figure 5:
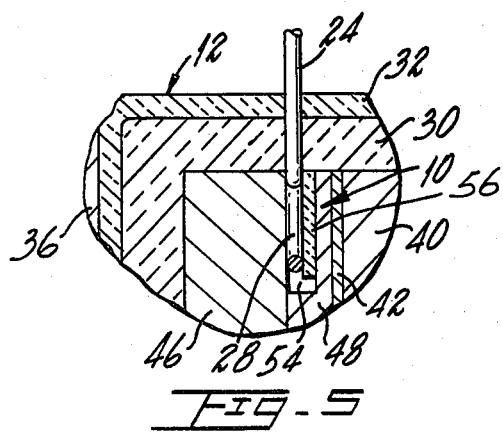
FIGS. 5 and 6 are expanded views of portions of FIGS. 3 and 4, respectively, which illustrate in more detail the preferred embodiment of the present invention.
Figure 6:
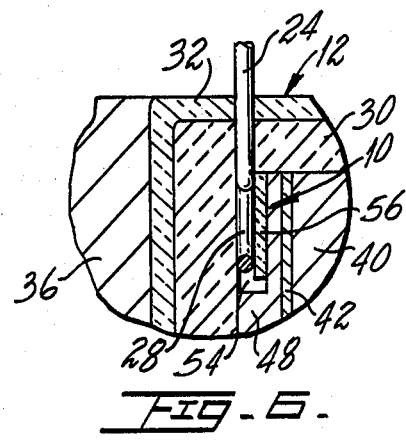

FIGS. 3, 4, 5 and 6 illustrate in more detail the battery 12 and the associated depletion gauge 10. More particularly, FIG. 3 and the corresponding FIG. 5 illustrate the battery 12 and depletion gauge 10 prior to any load, such as a cardiac pacer, being applied to the battery 12. FIG. 4 and the corresponding FIG. 6 illustrate the battery 12 and the depletion gauge 10 after the battery 12 has been depleted to a predetermined level necessary to provide an indication of the depletion level.

As illustrated in FIG. 3, a pair of cathode plates 34, 36 are positioned within the conductive case 14 with major surfaces of each of the cathode plates 34, 36 in direct electrical contact with the conductive case 14. The cathode plates 34, 36 may take various forms but are preferably formed of cupric sulphide.

An anode assembly 38 is also positioned within the conductive case 14 and is interposed between the other major surfaces of the cathode plates 34, 36. The anode assembly 38 includes a first lithium anode 40 which is in electrical contact with a current collector 42. The current collector 42 is in turn electrically connected to the end 22 of the anode lead 18. A second lithium anode 44 is bonded to the other side of the current collector 42. The second lithium anode 44 is comprised of two lithium plates, 46, 48, which have major surfaces in electrical contact with each other. The first lithium anode 40, the current collector 42, and the two lithium plaste 46, 48 are held tightly together in side-by-side configuration by an outer insulative covering 30. A second insulative covering 32 is positioned around the first insulative covering 50 to provide a more complete seal between the lithium anode elements and the cathode plates 34, 36.

The depletion gauge 10 includes a conductive sensing wire 24 which extends through the lid member 16 and through both of the insulative coverings 30, 32. A portion of the outer surface of the inner lithium plate 48 is removed to form a stepped portion 54. When the stepped portion 54 is formed, a gap is created between the inner lithium plate 48 and the outer lithium plate 46 for placement of the conductive sensing wire 24.

As is illustrated in more detail in FIG. 5, the end 28 conductive sensing wire 24 which is formed in a crook configuration is placed in direct electrical contact with the outer lithium plate 48. An insulative pad 56 is interposed between the end 28 of the sensing wire 24 and the inner lithium plate 48 to electrically isolate the inner plate 48 from the sensing wire 24.

As is now apparent with reference to FIGS. 3 and 5, a voltage potential will be developed between the sensing wire 24 and the outer conductive case 14. At the point at which the outer lithium plate has been consumed, the sensing wire 24 is no longer in electrical contact with any lithium material with the result that the voltage potential between the sensing wire 24 and the outer casing 14 falls to zero volts.

FIGS. 4 and 6 illustrate the battery 12 at the point in time when the outer lithium plate 46 has been depleted or consumed. The cathode plates 34, 36 are increased in thickness as material migrates to these elements. The outer lithium slab 46 is entirely consumed with the result that the voltage potential between the sensing wire 24 and the outer conductive housing 14 has decreased to zero volts. However, the voltage potential for a device powered by the battery 12 continues to be developed by the battery because of the fact that the first lithium anode 40 has been only partially consumed and the inner lithium plate 48 have not been consumed. Once these lithium plates are consumed, the battery becomes entirely depleted.

As may be apparent, the ratio of the inner lithium plate 48 and the outer lithium slab 46 may be adjusted so that an indication of battery depletion may be provided at any predetermined percentage of total battery depletion. For example, if the ratio of the thickness of the inner lithium plate 48 to the thickness of both lithium plates 46, 48 is made equal to 1 to 10, the voltage between the sensing wire 24 and the outer conductive case 14 will drop to zero when the battery 12 is 90 percent depleted. The thickness of the lithium anode 40 is made equal to the combined thickness of the inner and center lithium plates 46, 48. Obviously, other ratios could be utilized to give different percentages of depletion.

While the lithium anodes 40, 46, 48 have been shown as of a plate or slab configuration, it should be understood that the invention is equally applicable to anodes of other configurations. Also, while the invention has been shown with a single sensing element, it should be understood that the invention could be used with multiple sensing elements to indicate multiple levels of battery depletion. In addition, while the preferred embodiment has been illustrated with a cathode element of cupric sulfide and an anode element of lithium, it should be appreciated that the invention is useful with any elements which are physically consumed during depletion of the battery.

Thus, while a preferred embodiment of the invention has been described and shown in particularly, the inventon may be embodied in various other configurations and arrangements.

What is claimed is:

1. A lithium cell comprising:
    an outer conductive housing;
    at least one cathode member being positioned within the conductive housing and having two major surfaces one of which is in direct electrical contact with the conductive housing;
    an insulative separator being positioned against the outer major surface of the cathode member;
    a first lithium anode of a predetermined thickness having first and second major surfaces, said first surface thereof is positioned adjacent to the insulative separator;
    a second lithium anode of a predetermined thickness having first and second major surfaces, said first surface thereof is positioned adjacent to the second surface of the first lithium anode, the first major surface of said second lithium anode having a stepped portion to thereby form a gap between a portion of the first surface of said second lithium anode and the second surface of said first lithium anode;
    an anode lead electrically connected to the second lithium anode, said lead extending out of the conductive housing and being electrically insulated from the housing;
    an electrical sensing conductor positioned within the gap between the surfaces of the first and second lithium anodes, said electrical conductor being in electrical contact with the first lithium anode;

an insulative pad interposed between said electrical conductor and said second lithium anode; and, said electrical conductor extending out of said conductive housing and being electrically insulated from said housing so that an electrical potential is developed between the electrical conductor and the conductive housing until the first lithium anode is consumed by discharge of the cell to thereby provide an indication of a predetermined level of discharge of the cell.

2. A lithium cell as defined in claim 1 including a third lithium anode of a thickness equal to approximately the combined thickness of the first and second anodes, said third anode being electrically connected to said anode lead.

3. A lithium cell as defined in claim 2 including a second cathode member positioned within the conductive housing and having two major surfaces one of which is in direct contact with the conductive housing, and a second insulative separator interposed between said second cathode member and said third anode.

4. A lithium cell as defined in claim 3 wherein the ratio of the thickness of the second anode to the combined thickness of the first and second anodes is approximately 1 to 10.

5. A lithium cell comprising:

at least one cathode member being positioned within the conductive housing and having two major surfaces one of which is in direct electrical contact with the conductive housing.

an insulative separator being positioned against the outer major surface of the cathode member;

a first lithium anode of a predetermined thickness having first and second major surfaces, the first surface major thereof is positioned adjacent to the insulative separator, the second major surface of said first lithium anode having a stepped portion;

a second lithium anode of a predetermined thickness having first and second major surfaces, said first surface thereof is positioned adjacent to the second surface of the first lithium anode over substantially the entire surface area of the second surface of the first lithium anode;

an anode lead electrically connected to the second lithium anode, said lead extending out of the conductive housing and being electrically insulated from the housing;

an electrical sensing conductor positioned between the surfaces of the first and second lithium anodes in a region defined by the stepped portion of the surface of the first lithium anode, said electrical conductor being in electrical contact with the first lithium anode;

an insulative pad interposed between said electrical conductor and said second lithium anode; and, said electrical cconductor extending out of said conductive housing and being electrically insulated from said housing so that an electrical potential is developed between the electrical conductor and the conductive housing until the first lithium anode is consumed by discharge of the cell to thereby provide an indication of a predetermined level of discharge of the cell.

6. A lithium cell as defined in claim 5 including a third lithium anode of a thickness equal to approximately the combined thickness of the first and second anodes, said third anode being electrically connected to said anode lead.

7. A lithium cell as defined in claim 6 including a second cathode member positioned within the conductive housing and having two major surfaces one of which is in direct contact with the conductive housing, and a second insulative separator interposed between said second cathode member and said third anode.

8. A lithium cell as defined in claim 7 wherein the ratio of the thickness of the second anode to the combined thickness of the first and second anodes is approximately 1 to 10.

* * * * *

UNITED STATES PATENT AND TRADEMARK OFFICE
CERTIFICATE OF CORRECTION

PATENT NO. : 4,388,380
DATED : June 14, 1983
INVENTOR(S) : Abel De Haan and Harshad Tataria It is certified that error appears in the above-identified patent and that said Letters Patent is hereby corrected as shown below:

Column 4, line 49, "outer" should be --other--.
Column 5, line 34, "outer" should be --other--.

Signed and Sealed this

First Day of November 1983

[SEAL]

Attest:

GERALD J. MOSSINGHOFF

Attesting Officer

Commissioner of Patents and Trademarks